(12) United States Patent
Jeon et al.

(10) Patent No.: US 9,010,149 B2
(45) Date of Patent: Apr. 21, 2015

(54) VACUUM GLASS PANEL AND MANUFACTURING METHOD OF SAME

(75) Inventors: Euy-Sik Jeon, Cheonan-si (KR); Sang-In Moon, Cheonan-si (KR); Jeong-Bae Kim, Cheonan-si (KR)

(73) Assignee: Kongju National University Industry-University Cooperation Foundation, Gongju-si (KR)

( * ) Notice: Subject to any disclaimer, the term of this patent is extended or adjusted under 35 U.S.C. 154(b) by 0 days.

(21) Appl. No.: 13/643,135

(22) PCT Filed: Feb. 23, 2011

(86) PCT No.: PCT/KR2011/001208
§ 371 (c)(1),
(2), (4) Date: Oct. 24, 2012

(87) PCT Pub. No.: WO2012/081766
PCT Pub. Date: Jun. 21, 2012

(65) Prior Publication Data
US 2013/0273296 A1 Oct. 17, 2013

(30) Foreign Application Priority Data

Dec. 13, 2010 (KR) .................. 10-2010-0127013
Dec. 31, 2010 (KR) .................. 10-2010-0140262

(51) Int. Cl.
*C03C 8/02* (2006.01)
*E06B 3/663* (2006.01)
(Continued)

(52) U.S. Cl.
CPC ............. *E06B 3/6736* (2013.01); *C03B 23/245* (2013.01); *E06B 3/6608* (2013.01); *E06B 3/6612* (2013.01); *E06B 3/66304* (2013.01); *Y02B 80/24* (2013.01)

(58) Field of Classification Search
CPC ...... C03B 23/203; C03B 23/24; C03B 23/245
USPC ................... 65/36, 152, 42–43; 156/99, 104; 428/426
See application file for complete search history.

(56) References Cited

U.S. PATENT DOCUMENTS 2,521,048 A 9/1950 Day
2,683,906 A * 7/1954 Nevins ............................ 52/209
(Continued)

FOREIGN PATENT DOCUMENTS

DE 975079 8/1961
EP 1508551 2/2005
(Continued)

OTHER PUBLICATIONS

Machine Translation of KR2002077930.*
(Continued)

*Primary Examiner* — Jodi C Franklin
(74) *Attorney, Agent, or Firm* — Lexyoume IP Meister, PLLC

(57) ABSTRACT

Disclosed are a vacuum glass panel and a manufacturing method of the same. The vacuum glass panel according to the present invention includes a first glass plate, a second glass plate facing the first glass plate with a vacuum space therebetween, an edge of the second glass plate being in contact with the first glass plate, and a plurality of spacers disposed between the first glass plate and the second glass plates to separate the first glass plate and the second glass plate from each other. The plurality of spacers are formed of a glass including alumina ($Al_2O_3$) particles and silica ($SiO_2$) particles.

13 Claims, 19 Drawing Sheets

(51) Int. Cl.
  *E06B 3/673* (2006.01)
  *C03B 23/24* (2006.01)
  *E06B 3/66* (2006.01)

(56) References Cited

U.S. PATENT DOCUMENTS

| | | | |
|---|---|---|---|
| 2,842,699 A * | 7/1958 | Germeshausen et al. | 313/597 |
| 3,222,153 A * | 12/1965 | Browne | 65/43 |
| 3,522,026 A * | 7/1970 | Petrella et al. | 65/40 |
| 4,618,355 A * | 10/1986 | Otto et al. | 65/36 |
| 5,174,802 A * | 12/1992 | Hsu | 65/34 |
| 5,693,111 A * | 12/1997 | Kadowaki et al. | 65/43 |
| 6,105,336 A | 8/2000 | Katoh | |
| 2002/0078711 A1 | 6/2002 | Domi | |
| 2003/0137230 A1 | 7/2003 | Martin | |
| 2005/0103052 A1* | 5/2005 | Minaai | 65/43 |
| 2005/0217319 A1* | 10/2005 | Yoshizawa | 65/34 |
| 2007/0007875 A1* | 1/2007 | Kawaguchi et al. | 313/482 |
| 2007/0051134 A1* | 3/2007 | Hashimoto et al. | 65/36 |
| 2008/0053592 A1* | 3/2008 | Khadilkar et al. | 156/89.11 |
| 2008/0238315 A1* | 10/2008 | Hojo et al. | 313/582 |
| 2009/0104461 A1* | 4/2009 | Young et al. | 428/447 |
| 2009/0308105 A1* | 12/2009 | Pastel et al. | 65/42 |
| 2009/0324919 A1 | 12/2009 | Lang | |
| 2010/0186449 A1* | 7/2010 | Aitken et al. | 65/34 |
| 2010/0275654 A1 | 11/2010 | Wang | |
| 2011/0135857 A1* | 6/2011 | Logunov et al. | 428/34.6 |
| 2011/0183118 A1* | 7/2011 | Lamberson et al. | 428/157 |
| 2011/0223360 A1* | 9/2011 | Shibuya et al. | 428/34 |
| 2011/0223371 A1* | 9/2011 | Kawanami | 428/76 |
| 2012/0052275 A1* | 3/2012 | Hashimoto et al. | 428/215 |
| 2012/0055196 A1* | 3/2012 | Matsumoto et al. | 65/43 |
| 2012/0055553 A1* | 3/2012 | Logunov et al. | 136/263 |
| 2012/0145277 A1* | 6/2012 | Bruneaux et al. | 138/141 |
| 2012/0213952 A1* | 8/2012 | Dennis | 428/34 |
| 2012/0304696 A1* | 12/2012 | Miller et al. | 65/32.2 |
| 2013/0104980 A1* | 5/2013 | Sridharan et al. | 136/259 |
| 2013/0111953 A1* | 5/2013 | Maloney et al. | 65/43 |
| 2013/0134396 A1* | 5/2013 | Shimomura et al. | 257/40 |

FOREIGN PATENT DOCUMENTS

| | | | |
|---|---|---|---|
| JP | 08-091874 A | | 4/1996 |
| KR | 10-1999-0067378 A | | 8/1999 |
| KR | 10-2002-0077930 A | | 10/2002 |
| KR | 2002077930 | * | 10/2002 |
| KR | 10-2005-0084160 A | | 8/2005 |
| KR | 2005084160 | * | 8/2005 |
| KR | 10-0957667 B1 | | 5/2010 |
| WO | 01/23700 A1 | | 4/2001 |

OTHER PUBLICATIONS

Machine Translatin of KR 2005084160.*
European Patent Office, European Search Report dated Jun. 10, 2014, of the corresponding European Patent Application No. 11849044.0.

* cited by examiner

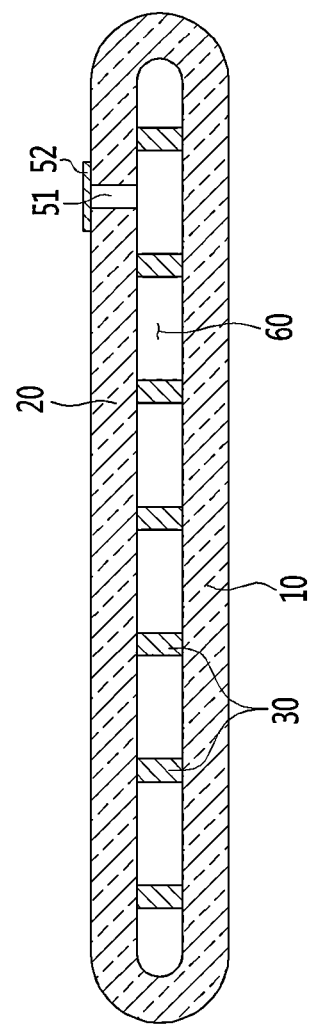

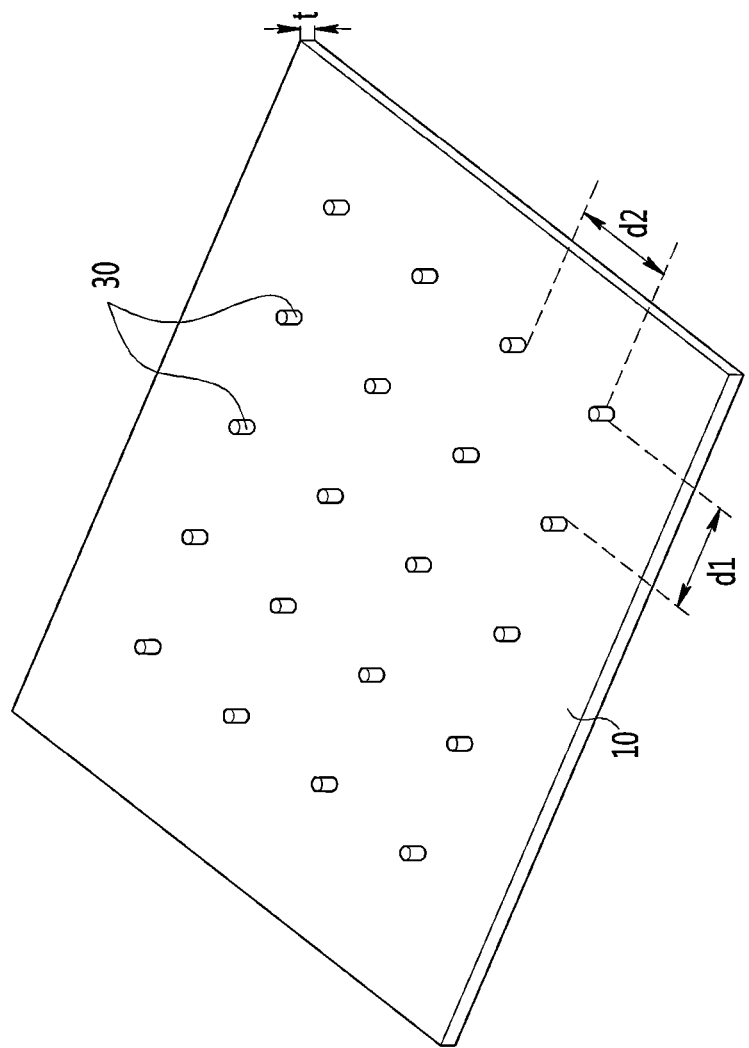

VACUUM GLASS PANEL AND MANUFACTURING METHOD OF SAME

CROSS-REFERENCE TO RELATED APPLICATION

This application claims priority to and the benefit of Korean Patent Application Nos. 10-2010-0127013, and 10-2010-0140262 filed in the Korean Intellectual Property Office on Dec. 13, 2010, and Dec. 31, 2010, the entire contents of which are incorporated herein by reference.

BACKGROUND OF THE INVENTION (a) Field of the Invention

The present invention relates to a vacuum glass panel, and more particularly to, a plurality of spacers interposed between two glass plates to support an external force and an edge sealing technology integrally welding edges of two plates separated from each other.

(b) Description of the Related Art

A vacuum glass panel has a structure where a vacuum space is formed between two glass plates, and receives attention as future door and window materials due to its insulation performance. The vacuum glass panel receives complex dynamic stresses such as pressure applied by atmospheric pressure, a temperature difference between an inside and an outside, wind and the like. It is necessary to arrange a supporter, that is, a spacer, in order to overcome the dynamic stresses and maintain a gap between the two glass plates.

The spacer itself has to retain a large compression strength to effectively withstand the pressure applied by atmospheric pressure and has to be firmly fixed to a designated position. As a spacer forming method in the related art, there is a method of partially applying a glass glue liquid to the glass plate and distributing the spacers to fix the spacers to positions where the glass glue liquid has been applied. However, omission or errors in arrangements of the spacers frequently occur in the method, which may generate errors in products.

In a case of a large area vacuum glass panel, a method of disposing a lattice-shaped spacer between two glass plates and welding the spacer and the glass plates by using an ultrasonic wave, a laser beam or the like in an electric furnace of a vacuum atmosphere is disclosed. However, the method requires expensive equipment and has a complicated manufacturing process.

Meanwhile, stress applied to the glass plate significantly varies depending on an arrangement type and a gap of the spacers. When the spacer does not uniformly support an external pressure over an entire vacuum glass panel, a crack is generated by stresses from the glass plate itself according to a pressure inclination phenomenon. Further, a tensile stress is generated near the spacer in the external surfaces of the glass plate, and when the tensile stress exceeds a maximum allowable tensile stress, self-destruction occurs.

Accordingly, researches on an optimal arrangement type, arrangement gap and the like of the spacer, which can improve a mechanical strength of the vacuum glass panel or maintain the mechanical strength of the vacuum glass panel with the minimum number of spacers by considering a distribution of the stresses applied to the glass plate are required.

In addition, in the general vacuum glass panel, edges of two glass plates are integrally welded by a sealing material, an internal space is evacuated through an exhaust hole formed in one glass plate, and then the exhaust hole is sealed by a cap member, so that the vacuum glass panel remains in a vacuum state.

The sealing material is formed of a general glass frit, and is disposed between two glass plates and then heated at a temperature equal to or higher than approximately 400° C. in the atmosphere. Then, the sealing material is melted and integrally welded with the two glass plates. However, such a high temperature sealing method may create deformation or discoloration of the glass plate. For example, in a case of a low emissivity glass plate, a metal coating film is oxidized and discolored, and as a result, a radiant heat blocking function may be lost.

In order to compensate for the high temperature sealing method, a low temperature sealing method of melting the sealing material at a temperature of approximately 200° C. by using a low melting point sealing material including indium has been proposed. However, in this case, a manufacturing cost of the vacuum glass panel is increased since the sealing material is expensive, and a degassing phenomenon is generated from the sealing material after being evacuated and thus a vacuum degree of the vacuum glass panel is reduced, thereby deteriorating the insulation performance.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a vacuum glass panel which improves bearing power of a spacer by increasing a compression strength of the spacer and optimizing shape characteristics of the spacer and an arrangement type and an arrangement gap by considering a distribution of stresses applied to a glass plate.

The present invention has also been made in an effort to provide a method of manufacturing a vacuum glass panel which easily dispose the spacer on a large area glass plate and firmly fix the spacer to a designated position without omission or arrangement error.

The present invention has also been made in an effort to provide a vacuum glass panel and a manufacturing method of the same which solve deformation and discoloration problems of the glass plate according to the use of a sealing material and prevent a vacuum degree from deteriorating by degassing of the sealing material.

The present invention has also been made in an effort to provide a vacuum glass panel and a manufacturing method of the same, which simplify a manufacturing process, reduce manufacturing costs, and are advantageous to a large size.

An exemplary embodiment of the present invention provides a vacuum glass panel including: a first glass plate; a second glass plate having an edge being in contact with the first glass plate and facing the first glass plate with a vacuum space therebetween; and a plurality of spacers disposed between the first glass plate and the second glass plate to separate the first glass plate and the second glass plate from each other. The plurality of spacers may be formed of a glass including alumina ($Al_2O_3$) particles and silica ($SiO_2$) particles.

A content of the alumina ($Al_2O_3$) particles may be greater than a content of the silica ($SiO_2$) particles.

The plurality of spacers may further include titanium dioxide ($TiO_2$) particles.

A content of the alumina ($Al_2O_3$) particles may be greater than a content of the silica ($SiO_2$) particles, and the content of the silica ($SiO_2$) particles may be greater than a content of titanium dioxide ($TiO_2$) particles.

The alumina (Al₂O₃) particles may have a size ranging from 1 μm to 10 μm.

The plurality of spacers may be directly attached to one of the first glass plate and the second glass plate, and formed in one shape of a circular cylinder and a polyhedral column.

The plurality of spacers may have a height ranging from 50 μm to 1,000 μm and an average diameter ranging from 100 μm to 1,000 μm.

The plurality of spacers may be arranged in one form selected from the group consisting of a rectangle, a rhombus, a square, and a hexagon. The plurality of spacers may be arranged in a square type.

The first glass plate and the second glass plate may have an equal thickness, and the first glass plate, the second glass plate, and the plurality of spacers may satisfy conditions of $$D \leq 7t + 6 \text{ mm}$$

where t denotes a thickness (mm) of the first glass plate and, D denotes a distance (mm) between the plurality of spacers.

Another exemplary embodiment of the present invention provides a method of manufacturing a vacuum glass panel, including: preparing a paste for a spacer; screen-printing the paste on one of a first glass plate and a second glass plate and drying the paste to form a plurality of spacers; laminating the first glass plate and the second glass plate with the plurality of spacers therebetween; and welding edges of the first glass plate and the second glass plate and evacuating an internal space to form a vacuum space.

The paste may include at least one of a water glass and silica sol, an alumina (Al₂O₃) powder, a silica (SiO₂) powder, and a plasticizer.

The paste may further include a titanium dioxide (TiO₂) powder, and in the paste, a content of the alumina (Al₂O₃) powder may be greater than a content the silica (SiO₂) powder and the content the silica (SiO₂) powder may be greater than a content of the titanium dioxide (TiO₂) powder.

The paste may include at least one compound 40 wt % to 50 wt % selected from the group consisting of the water glass and the silica sol, alumina (Al₂O₃) powder 20 wt % to 30 wt %, silica (SiO₂) powder 15 wt % to 20 wt % and plasticizer 5 wt % to 10 wt %.

The paste may have a viscosity ranging from 2,000 cps to 20,000 cps.

When edges of the first glass plate and the second glass plate are welded, at least two torch parts may be disposed at external sides of the edges of the first glass plate and the second glass plate, and the edges of the first glass plate and the second glass plate may be welded by melting the edges by using heat of the torch part. The at least two torch parts may be disposed on opposite sides with the first glass plate and the second glass plate therebetween, and move in opposite directions.

The first glass plate and the second glass plate may be formed of a square plate including a pair of first edges and a pair of second edges facing each other, a first torch part and a second torch part may be located at external sides of the pair of first edges, respectively, and the first torch part and the second torch part may move in opposite directions to weld the pair of first edges.

A start position of the first torch part may be an external side of one corner of the first edge, and a start position of the second torch part may be an external side of the other corner of the first edge.

After the pair of first edges is welded, the first torch part and the second torch part may move to external sides of the pair of second edges, respectively, and move in opposite directions to weld the pair of second edges.

A start position of the first torch part for the pair of second edges may be an external side of one corner of the second edge, and a start position of the second torch part may be an external side of the other corner of the second edge.

A third torch part and a fourth torch part may be located on external sides of the pair of second edges, respectively, and the third torch part and the fourth torch part may move in opposite directions while the first torch part and the second torch part move to simultaneously weld the pair of first edges and the pair of second edges.

A start position of the third torch part may be an external side of one corner of the second edge, and a start position of the fourth torch part may be an external side of the other corner of the second edge.

The first torch part, the second torch part, the third torch part, and the fourth torch part may simultaneously move in a clockwise direction or a counterclockwise direction.

At least two torch parts may be slantly installed such that end parts toward the first glass plate and the second glass plate face upwards or downwards.

Yet another exemplary embodiment of the present invention provides a vacuum glass panel manufactured by the aforementioned method, wherein edges of a first glass plate and a second glass plate are in contact with each other and integrally welded, and are convexly formed outwards.

When flat portions of the first glass plate and the second glass plate are flat parts and the edges of the first glass plate and the second glass plates being in contact with each other are a convex part, the convex part may satisfy at least one of two condition of $$(t1 + (d/2)) \leq R \leq 4(t1 + (d/2)) \qquad 1$$

$$0.6t1 \leq t2 \leq 1.4t1 \qquad 2$$

where t1 denotes a thickness of the flat part, d denotes a gap between the first glass plate and the second glass plate measured in the flat part, R is a curvature of an external side of the convex part, and t2 is a center thickness of the convex part measured along a surface direction of the flat part.

The first glass plate and the second glass plate may be formed of one of a sheet glass, a tempered glass, and a low-E glass.

According to an exemplary embodiment of the present invention, it is possible to improve bearing power of a spacer by increasing a compression strength of the spacer and optimize shape characteristics of the spacer and an arrangement type and an arrangement gap by considering a distribution of stresses applied to a glass plate. It is possible to easily dispose the spacer on a large area glass plate and firmly fix the spacer to a designated position without omission or arrangement fault. It is possible to solve deformation and discoloration problems of the glass plate according to the use of a sealing material and prevent a vacuum degree from deteriorating by degassing of the sealing material. It is possible to simplify a manufacturing process of the vacuum glass panel and reduce manufacturing costs.

BRIEF DESCRIPTION OF THE DRAWINGS

FIG. 2 is a cross-sectional view of the vacuum glass panel illustrated in FIG. 1.

FIG. 3 is a perspective view schematically illustrating a first glass plate and a spacer of the vacuum glass panel illustrated in FIG. 1.

DETAILED DESCRIPTION OF THE EMBODIMENTS

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
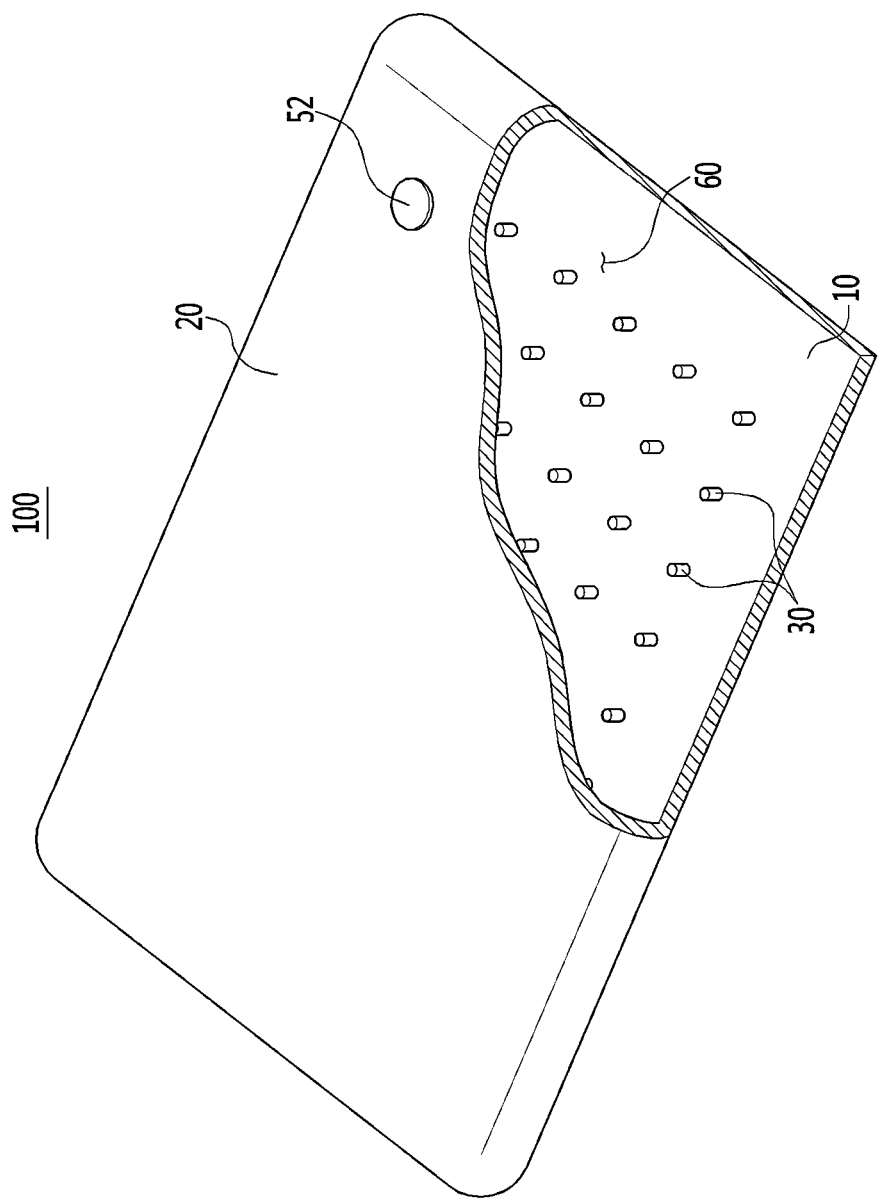
FIG. 1 is a partially cut-away perspective view of a vacuum glass panel according to an exemplary embodiment of the present invention.

FIG. 1 is a partially cut-away perspective view of a vacuum glass panel according to an exemplary embodiment of the present invention, and FIG. 2 is a cross-sectional view of the vacuum glass panel illustrated in FIG. 1.

Referring to FIGS. 1 and 2, a vacuum glass panel 10 includes a first glass plate 11, a second glass plate 12 facing the first glass plate 11, a plurality of spacers 13 disposed between the first glass plate 11 and the second glass plate 12. Edges of the first glass plate 11 and the second glass plate 12 are in contact to seal a space between the two glass plates 11 and 12.

The first glass plate 11 and the second glass plate 12 may be formed of one of a sheet glass, a tempered glass, and a low emissivity (Low-E) glass. The plurality of spacers 13 have an equal shape and size to each other, and are regularly arranged with a uniform distance therebetween. The spacer 13 is disposed between the first glass plate 11 and the second glass plate 12 to separate the two glass plates 11 and 12 from each other. The first glass plate 11 and the second glass plate 12 are not limited to a particular type of glass.

The edges of the first glass plate 11 and the second glass plate 12 may be welded with each other by torch heating. That is, when the edges of the first glass plate 11 and the second glass plate 12 laminated with the spacer 13 therebetween are heated by a torch, the edges of the two glass plates 11 and 12 are melted and attached and then welded with each other.

An exhaust hole 14 is formed in one of the first glass plate 11 and the second glass plate 12, and a cap member 15 is fixed to the one glass plate to seal the exhaust hole 14. The exhaust hole 14 is connected to an exhaust device (not shown) during a manufacturing process and used for evacuating an internal space of the vacuum glass panel 10. Accordingly, the internal space where the plurality of spacers 13 are located is a vacuum space 16, and the vacuum glass panel 10 has high insulation performance through the vacuum space 16.

The spacer 13 in the vacuum glass panel 10 according to the present exemplary embodiment includes a basic glass component, and alumina ($Al_2O_3$) particles and silica ($SiO_2$) particles for improving a compression strength. Further, the spacer 13 may further include titanium dioxide ($TiO_2$) particles. At this time, a content of the alumina particles is greater than a content of the silica particles, and the content of the silica particles is greater than a content of the titanium dioxide particles.

A size of the alumina ($Al_2O_3$) particle approximately may range from 1 μm to 10 μm. A reinforcement function of making the spacer 13 firm may be deteriorated when the size of the alumina ($Al_2O_3$) particle is smaller than 1 μm, and structural safety of the spacer 13 may be also deteriorated when the size of the alumina ($Al_2O_3$) particle is greater than 10 μm since the content of the alumina ($Al_2O_3$) particles included in the spacer 13 becomes small.

The silica ($SiO_2$) particles and the titanium oxide ($TiO_2$) particles serve to fill an empty space between the alumina ($Al_2O_3$) particles and make the spacer 13 firmer.

The spacer 13 may be manufactured through a process of directly screen-printing a paste including at least one of a water glass and silica sol, and an alumina ($Al_2O_3$) powder and a silica ($SiO_2$) powder on one of the first glass plate 11 and the second glass plate 12 in a pillar shape and then drying the paste. The paste may further include a titanium dioxide ($TiO_2$) powder. A detailed method of forming the spacer 13 will be described below.

A glass corresponding to a main component of the spacer 13 may be sodium silicate. The sodium silicate is applied to the glass plate in a water glass state and then experiences a drying process, thereby remaining in a solid state.

The alumina ($Al_2O_3$) is representative fine ceramics, which has high mechanical strength and abrasion resistance and has excellent thermal stability and chemical stability. The alumina ($Al_2O_3$) particle functions to improve bearing power of the spacer 13 by increasing the compression strength of the spacer 13. That is, the spacer 13 including the alumina ($Al_2O_3$) particle implements a higher compression strength in comparison with a case where the spacer 13 is formed of only a glass.

The silica ($SiO_2$) particle and the titanium dioxide ($TiO_2$) particle function to increase the compression strength of the space by reducing air gaps of the spacer 13. A material dried from sediment generated by neutralizing a water glass with an acid may be used as the silica ($SiO_2$) particle. Further, the silica ($SiO_2$) particle also functions as an extender of the spacer 13 since the silica ($SiO_2$) particle is a component equal to the main component of the spacer 13 corresponding to a glass.

The spacer 13 may be formed in various shapes such as a circular cylinder or a polyhedral column. The polyhedral column includes various types such as a square column, a rectangular column, a rhombus column, a pentagonal column, a hexagonal column and the like. FIG. 1 illustrates a spacer having a circular cylinder shape as an example.

A height of the spacer 13 may range from 50 μm to 1,000 μm, and an average diameter of the spacer 13 may range from 100 μm to 1,000 μm. When the height of the spacer 13 is shorter than 50 μm, an insulation effect is deteriorated, and a defect of attaching the first glass plate 11 and the second glass plate 12 may occur. On the other hand, when the height of the spacer 13 exceed 1,000 μm, it is difficult to manufacture the space 13 having a narrow diameter while maintaining a designated compression strength.

Since the spacer 13 serves as a path for transferring heat, the heat may be easily transferred between the first glass plate 11 and the second glass plate 12 through the spacer 13 as the average diameter of the spacer 13 is larger. Meanwhile, when the average diameter of the spacer 13 is smaller than 100 μm, a point-contact is almost generated between the first glass plate 11 and the second glass plate 12, so that a stress problem between the spacer 13 and the first and second glass plates 11 and 12 occurs. By considering such matters and problems on the manufacturing, a heat transferring problem and the stress problem may be resolved when the average diameter of the spacer 13 ranges from 100 μm to 1,000 μm.

Since the aforementioned spacer 13 is screen-printed on one of the first glass plate 11 and the second glass plate 12 without a separate adhesive material and then dried, the spacer 13 is integrally fixed to the corresponding glass plate during a drying process. Accordingly, the spacer 13 is firmly fixed to a designated position.

FIG. 3 is a perspective view schematically illustrating the first glass plate and the spacer of the vacuum glass panel illustrated in FIG. 1.

In FIG. 3, a thickness of the first glass plate 11 is indicated by t, a distance between the spacers 13 according to one direction (for example, horizontal direction) of the first glass plate 11 is indicated by d1, a distance between the spacers 13 according to another direction (for example, vertical direction) of the first glass plate 11 is indicated by d2. At this time, the second glass plate 12 which is not shown in FIG. 3 also has an equal thickness to that of the first glass plate 11.

A tensile stress is generated in the vacuum glass panel 10 due to a pressure difference between an internal vacuum pressure and an external atmospheric pressure. A method of optimizing an arrangement type and an arrangement gap of the spacer 13 by considering a distribution of stresses applied to the vacuum glass panel 10 will be described below.

The tensile stress is generated in a part of external surfaces of the two glass plates 11 and 12 supported by the spacer 13 and central parts of internal surfaces of the two glass plates 11 and 12 between the spacers 13. A maximum tensile stress is generated in the two glass plates 11 and 12 near the spacer 13. A maximum allowable tensile stress generated in the vacuum glass panel 10 is limited to 8 MPa, and self-destruction happens in the vacuum glass panel 10 when the maximum allowable tensile stress is exceeded.

FIGS. 4A to 4E illustrate various arrangement types of the spacer.

Figure 4A:
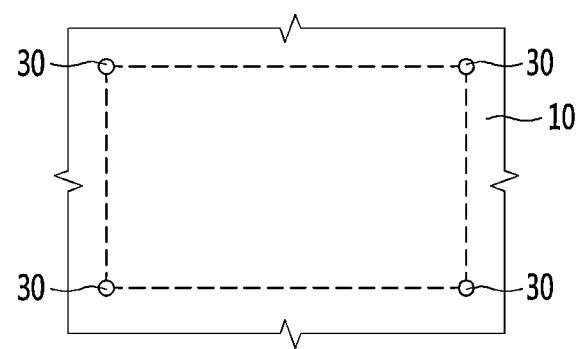
FIG. 4A to FIG. 4E are diagrams schematically illustrating various arrangement types of the spacer.
Figure 4B:
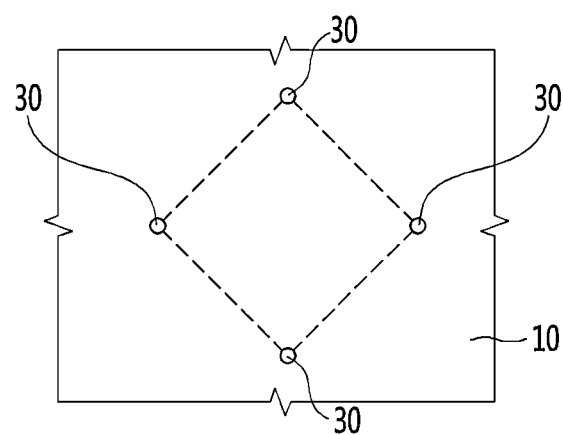
Figure 4C:
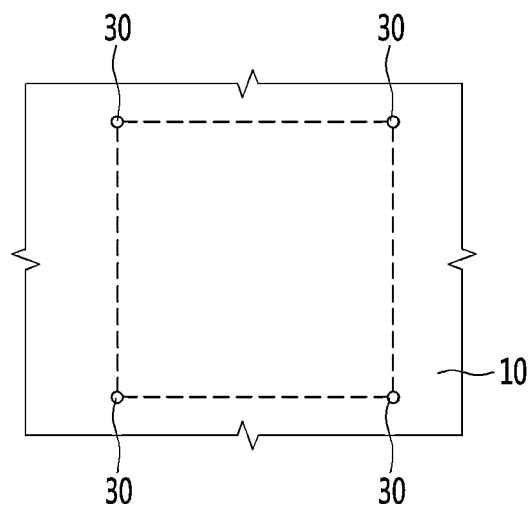
Figure 4D:
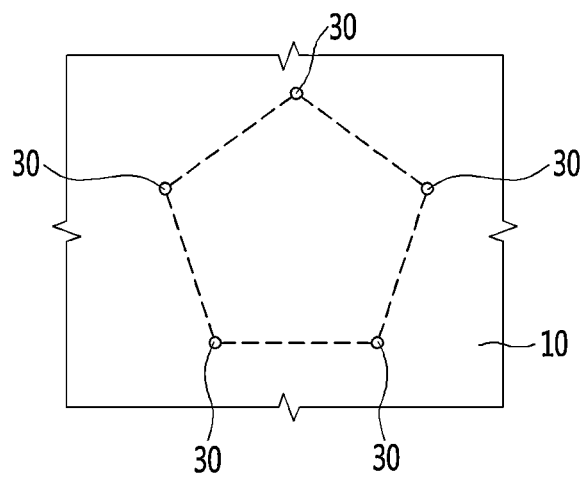
Figure 4E:
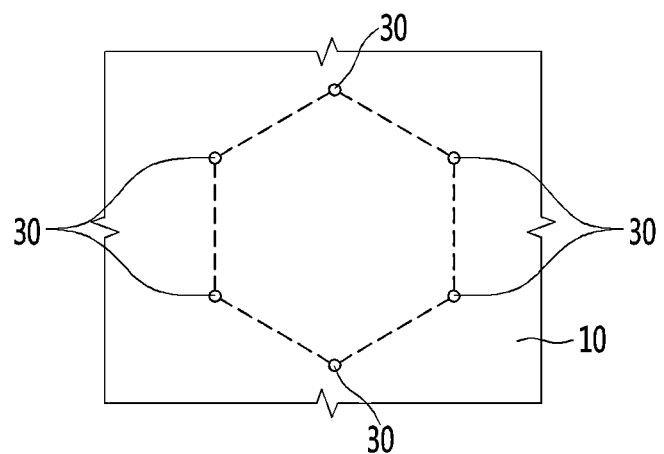

FIG. 4A illustrates that four spacers 13 are arranged in a rectangular type, and FIG. 4B illustrates that four spacers 13 are arranged in a rhombus type. FIG. 4C illustrates that four spacers 13 are arranged in a square type, and FIG. 4D illustrates that five spacers 13 are arranged in a pentagonal type. Further, FIG. 4E illustrates that six spacers 13 are arranged in a hexagonal type.

Table 1 below shows maximum tensile stresses of the vacuum glass panel 10 measured in the aforementioned five arrangement types. The vacuum glass panel 10 used in experiments has a width of 300 mm and a length of 300 mm, and the spacers 13 are arranged to have a gap approximately close to 8 MPa which is the maximum allowable tensile stress.

TABLE 1

| Arrangement type | Number of spacers | Distance between spacers (d1 × d2) (mm) | Maximum tensile stress (MPa) |
| --- | --- | --- | --- |
| Rectangle | 150 | 21 × 31.5 | 7.85 |
| Rhombus | 150 | 27 | 7.64 |
| Square | 144 | 27 × 27 | 7.88 |
| Pentagon | — | 24 | 7.35 |
| Hexagon | 155 | 22 | 7.20 |

Figure 5:
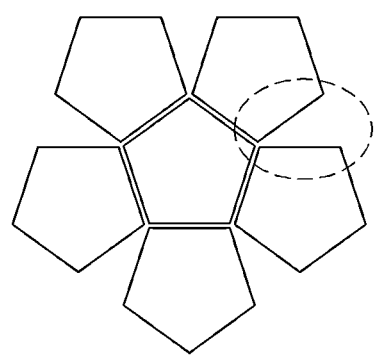
FIG. 5 is a diagram schematically illustrating a state where a pentagonal pattern of the space illustrated in FIG. 4D is expanded.

It may be identified from Table 1 that a successive pattern cannot be applied to the pentagonal pattern of the five arrangement types since an empty space (see a dotted line), which is not included in the pattern when the successive pattern is formed is generated as illustrated in FIG. 5. Accordingly, the pentagonal pattern of the five arrangement types is not desirable.

It may be identified that the largest number of spacers 13 are arranged in the hexagonal type of the remaining four arrangement types except for the pentagonal pattern, the same number of spacers 13 are arranged in the rectangular type and the rhombus type, and the smallest number of spacers 13 are arranged in the square pattern.

Accordingly, by considering the aforementioned matters, the spacers 13 may be arranged in the rectangular, rhombus, square, and hexagonal types, and the square type where the distance between the spacers 13 is widest and the smallest number of spacers 13 are arranged may be an optimal type among the above-listed types.

Next, an arrangement gap of the spacer 13 according to an arrangement gap when the plurality of spacers 13 are arranged in the square type will be described.

Table 2 below shows an optimal distance between the spacers 13 according to thicknesses of the glass plates 11 and 12. At this time, the thicknesses of the glass plates 11 and 12 correspond to a thickness of one glass plate, respectively, and the first glass plate 11 and the second glass plate 12 have the same thickness. The optimal distance between the spacers 13 is defined as a distance between the spacers 13 implementing a tensile stress most close to 8 MPa which is the maximum allowable tensile stress

TABLE 2

| Thickness of glass plate (mm) | Maximum allowable tensile stress (MPa) | Optimal distance between spacers (mm) |
| --- | --- | --- |
| 3 | 8 | 27.0 |
| 3.8 | | 32.6 |
| 4.8 | | 39.6 |
| 5.8 | | 46.6 |

The following equation may be obtained based on a result value of Table 2.

$$D \leq 7t+6 \text{ mm} \qquad \text{[Equation 1]}$$

Here, D denotes the arrangement gap (mm) of the spacers 13, and t denotes each thickness (mm) of the glass plates 11 and 12.

When conditions of the above equation are satisfied, the tensile stress of the vacuum glass panel 10 is increased, and thus an excellent mechanical strength may be implemented. Accordingly, it is possible to prevent deformation such as bending of the vacuum glass panel 10, and to effectively prevent cracks and self-destruction of the glass plates 11 and 12 by uniformly supporting an external pressure over an entirety of the vacuum glass panel 10 by the spacers 13.

Next, a method of manufacturing the aforementioned vacuum glass panel 10 will be described.

Figure 6:
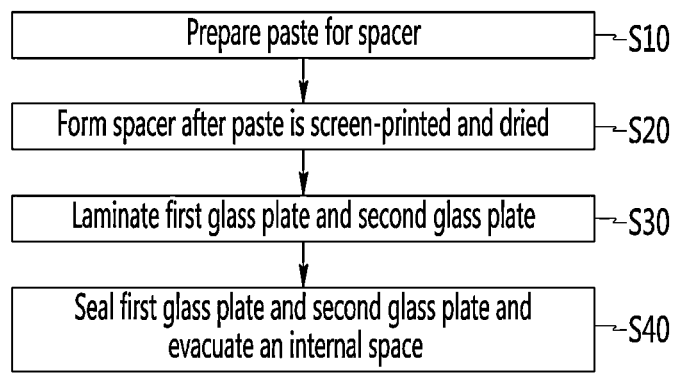
FIG. 6 is a flowchart illustrating a manufacturing process of the vacuum glass panel for each step according to an exemplary embodiment of the present invention.

FIG. 6 is a flowchart illustrating a vacuum glass panel manufacturing process according to an exemplary embodiment of the present invention.

Referring to FIG. 6, a method of manufacturing the vacuum glass panel includes a first step S10 of preparing a paste for the spacer, a second step S20 of screen-printing the paste on one of the first glass plate and the second glass plate and then drying the paste to form the spacer, a third step S30 of laminating the first glass plate and the second glass plate with the spacer therebetween, and a fourth step S40 of welding edges of the first glass plate and the second glass plate, evacuating an internal space, and sealing the internal space to form a vacuum space.

First, in the first step S10 of making the paste for the spacer, the paste includes at least one of sodium silicate (water glass) and silica sol, a alumina powder, a silica powder, and ethylene glycol as a plasticizer. The paste may further include a titanium dioxide powder.

The alumina powder functions to improve bearing power of the spacer by increasing the compression strength of the spacer. The ethylene glycol serves to delay hardening of the water glass sensitively reacting to a change in an external temperature and control flexibility of the water glass.

The silica powder and the titanium dioxide powder reduce air gaps of the spacer and serves as an extender for increasing an amount of the paste. Particularly, since the titanium dioxide powder has a size smaller than the silica power, the titanium dioxide powder serves to increase structural stability of the spacer.

In the paste, a content of the alumina power is greater than a content of the silica power, and the content of the silica power is greater than a content of the titanium dioxide power. For example, the paste for the spacer may include at least one compound 40 wt % to 50 wt % selected from the group consisting of the water glass and the silica sol, alumina powder 20 wt % to 30 wt %, silica powder 15 wt % to 20 wt % and ethylene glycol 5 wt % to 10 wt %.

The water glass and the silica sol have an equal property to that of the first glass plate 11 and the second glass plate 12, and functions as an adhesive because the water glass and the silica sol themselves have an adhesive property. As the paste includes at least one of the water glass and the silica sol as a main component, the spacer can be directly attached to the glass plate during the following screen-printing process.

That is, since a separate adhesive (for example, frit) for attaching the spacer to the glass plate can be omitted, it is possible to prevent an adhesive force deterioration problem due to differences between the frit in the related art and the glass plate and between the frit and the spacer.

When a content of at least one compound selected from the group consisting of the water glass and the silica sol is smaller than 40 wt % in the paste, adhesive performance of the spacer is deteriorated, and transmissivity of the spacer and transmissivity of the vacuum glass panel 10 may be deteriorated by alumina particles.

Meanwhile, when the content of at least one compound selected from the group consisting of the water glass and the silica sol is greater than 50 wt %, contents of the alumina power, the silica power, and the ethylene glycol are reduced, and thus the compression strength and the insulation performance of the spacer are deteriorated and it may be difficult to control the flexibility of the water glass and the silica sol. Further, many pores are generated by expansion in a future drying process, thereby deteriorating the compression strength of the spacer.

The aforementioned paste may be manufactured through a process of mixing at least one compound selected from the group consisting of the water glass and the silica sol, the alumina power, the silica power, the titanium dioxide power, and the ethylene glycol and stirring them. At this time, a viscosity of the paste may range from 2,000 cps to 20,000 cps.

When the viscosity of the paste is smaller than 2,000 cps, a spreading phenomenon may be generated in the screen-printing process, and it may be difficult to maintain a shape of the printed spacer. When the viscosity of the paste is greater than 20,000 cps, it may be difficult to perform the screen-printing itself since the paste is attached to a screen mask, and a rolling operation of the paste may not be smoothly performed before a squeegee.

As described above, the viscosity of the paste becomes an important factor for determining a printing quality of the spacer. The viscosity of the paste may be controlled by controlling a stirring speed and a stirring time of a stirrer (not shown), and may be also controlled according to a mixing ratio of at least one of the water glass and the silica sol, and an additive (alumina power, silica power, titanium dioxide power, and ethylene glycol).

Figure 7:
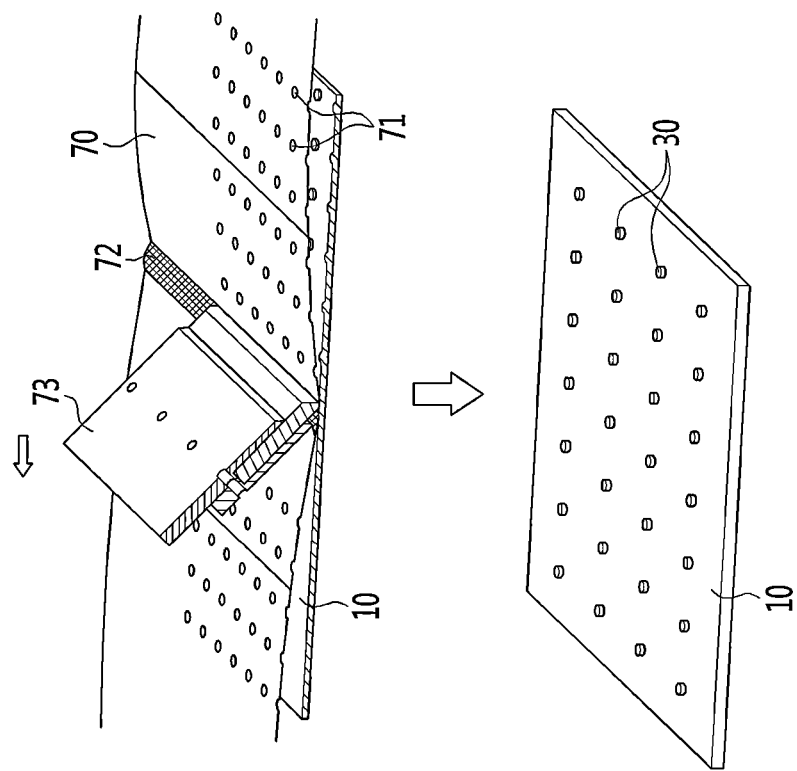
FIG. 7 is a perspective view schematically illustrating a second step of the manufacturing process of the vacuum glass panel illustrated in FIG. 6.

Next, in the second step S20, the spacer 13 is formed by screen-printing the aforementioned paste on one of the first glass plate 11 and the second glass plate 12 and then drying the paste. FIG. 7 is a perspective view schematically illustrating a screen-printing process of the spacer.

Referring to FIG. 7, the first glass plate 11 is mounted to a horizontal base plate (not shown) of a printing device. At this time, the first glass plate 11 is vacuum-adsorbed by the horizontal base plate, so that a movement of the first glass plate 11 may be forcibly constrained. The first glass plate 11 may be replaced with the second glass plate 12.

A screen mask 20 is disposed on the first glass plate 11. A metal mask may be used for the screen mask 20. A plurality of pattern forming holes 21 corresponding to the preset number of spacers 13 are formed in the screen mask 20. A size and a shape of the spacer 13 are determined according to a size and a shape of the pattern forming hole 21.

When the pattern forming hole 21 is a circle, the spacer 13 having a circular cylinder shape is formed. When the pattern forming hole 21 is a polygon such as a square, a rectangle, and a hexagon, the spacer 13 having a polyhedral column shape is formed. Further, a thickness of the screen mask 20 may range from 50 μm to 1,000 μm. The thickness of the screen mask 20 determines a height of the spacer 13.

The screen mask 20 is mounted to a separate mounting jig (not shown) and then automatically moves according to an input coordinate value in order to prevent an error in an arrangement with the first glass plate 11, and as a result, the screen mask 20 is disposed on the first glass plate 11.

Subsequently, a paste 22 is applied to the screen mask 20. At this time, since the paste 22 has a high viscosity, a squeegee 23 may be used to uniformly apply the paste 22 to an entirety of a top surface of the screen mask 20. In this case, a pressure applied to the squeegee 23 has to be lower than the pressure applied during the actual screen-printing process, and a movement speed of the squeegee 23 also has to be relatively faster than a speed implemented during the actual printing process.

Since the paste 22 for the spacer may be easily solidified when exposing to the air, the paste 22 should be sealed after the manufacturing, and it is possible to secure an excellent printing quality when the screen-printing process is quickly performed after applying the paste 22 to the screen mask 20.

Subsequently, the paste 22 is screen-printed on the first glass plate 11 by using the squeegee 23. The squeegee 23 moves in one direction while scraping the paste 22, and the paste 22 sequentially fills the pattern forming hole 21 of the screen mask 20 by the squeegee 23. At this time, for a good quality printing, a printing speed and a printing pressure should be controlled, and the printing speed and the printing pressure may be standardized in advance through a sampling test and then applied.

Subsequently, the screen mask 20 is removed from the first glass plate 11 and then the printed paste is dried, so that the solid spacer 13 is formed. In the drying process, a plasticizer (ethylene glycol) component vaporizes from the paste. The drying may be performed by a quick drying in a carbon dioxide atmosphere or performed by a heat drying. The spacer 13 made through such a process is formed in a circular cylinder column or a polyhedron column, and an arrangement type may be a rectangle, a rhombus, a square, or a hexagon, and an optimal type among them may be a square type.

Figure 8:
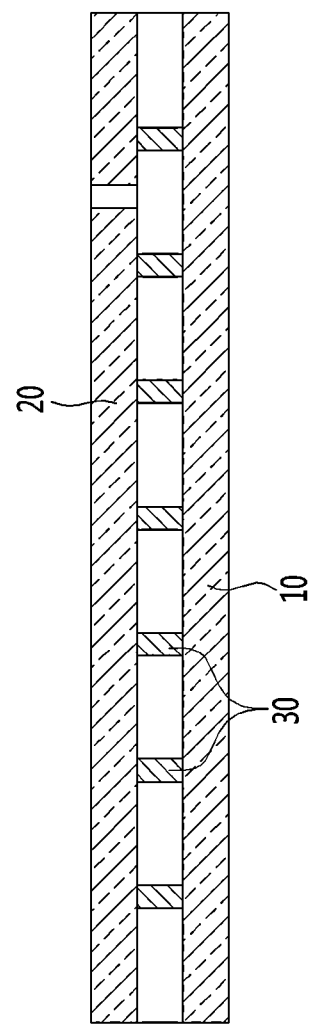
FIG. 8 is a cross-sectional view schematically illustrating a third step of the manufacturing process of the vacuum glass panel illustrated in FIG. 6.

FIG. 8 is a cross-sectional view schematically illustrating the third step of the vacuum glass panel manufacturing process illustrated in FIG. 6. Referring to FIG. 8, the first glass plate 11 and the second glass plate 12 are laminated with the spacer 13 therebetween in the third step S30.

Figure 9:
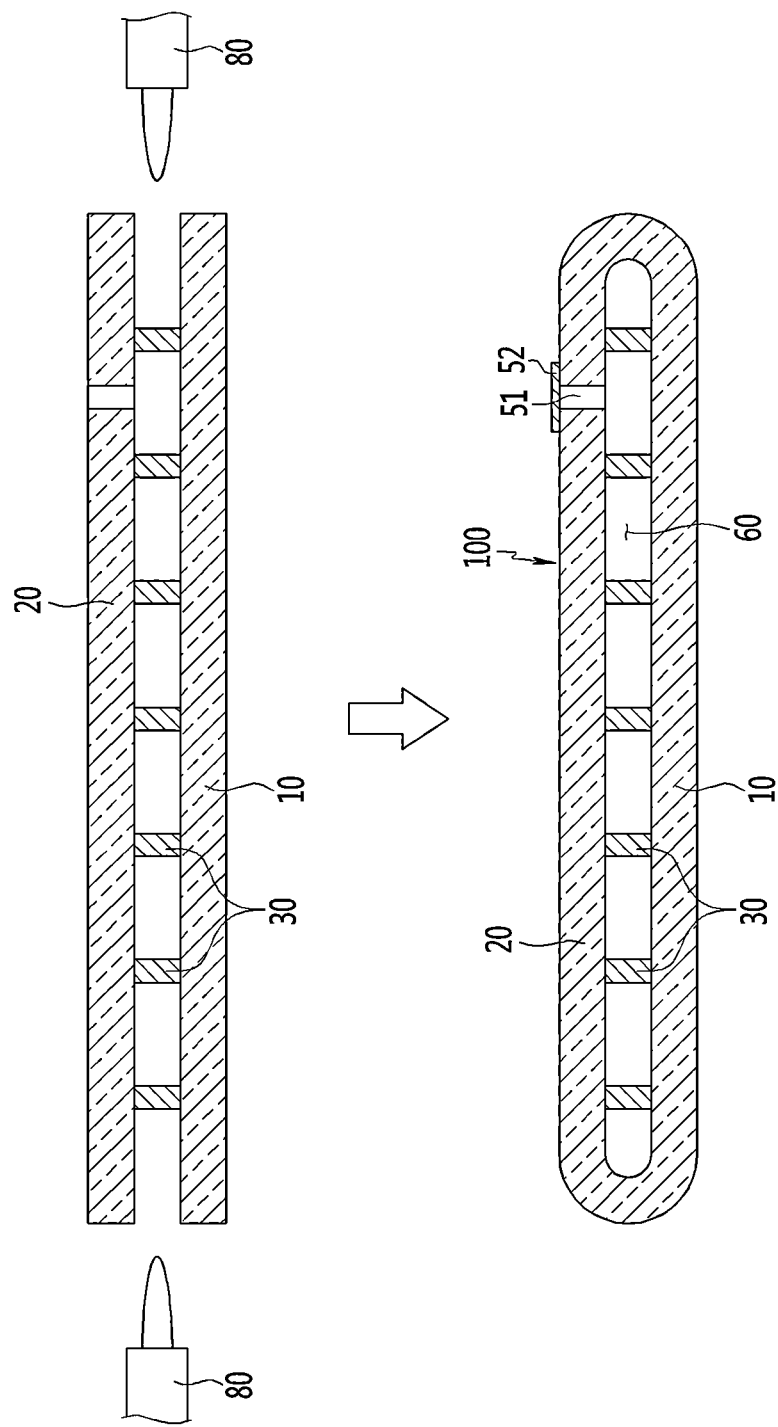
FIG. 9 is a cross-sectional view schematically illustrating a fourth step of the manufacturing process of the vacuum glass panel illustrated in FIG. 6.

FIG. 9 is a cross-sectional view schematically illustrating the fourth step of the vacuum glass panel manufacturing process illustrated in FIG. 6.

Referring to FIG. 9, edges of the first glass plate 11 and the second glass plate 12 are sealed so that the edges of the two glass plates 11 and 12 are in contact with each other in the fourth step S40. A torch 30 may be used in the process. Accordingly, a space between the first glass plate 11 and the second glass plate 12 may be sealed.

Subsequently, the internal space is evacuated by connecting an exhaust device (not shown) to the exhaust hole 14 formed in advance in one of the first glass plate 11 and the second glass plate 12, for example, the second glass plate 12. Thereafter, the cab member 15 covers the exhaust hole 14, which completes the vacuum glass panel 10.

The vacuum space 16 functioning as an insulation layer is formed within the vacuum glass panel 10 having experienced the aforementioned process, and the vacuum space 16 is secured and maintained by the spacer 13 having excellent compression strength and bearing power. At this time, an insulation function of the vacuum glass panel 10 may be improved by the spacer 13 including alumina particles and silica particles as well as the vacuum space 16.

It is possible to improve a production speed and a production quality of the vacuum glass panel 10 by the aforementioned screen-printing method and firmly fix the spacer 13 to a designated position without omission or arrangement fault. Further, it is possible to save material costs and manufacturing costs and reduce a process time by simplifying a printing process and minimizing printing defects through controls of the paste viscosity and the printing speed.

Figure 10:
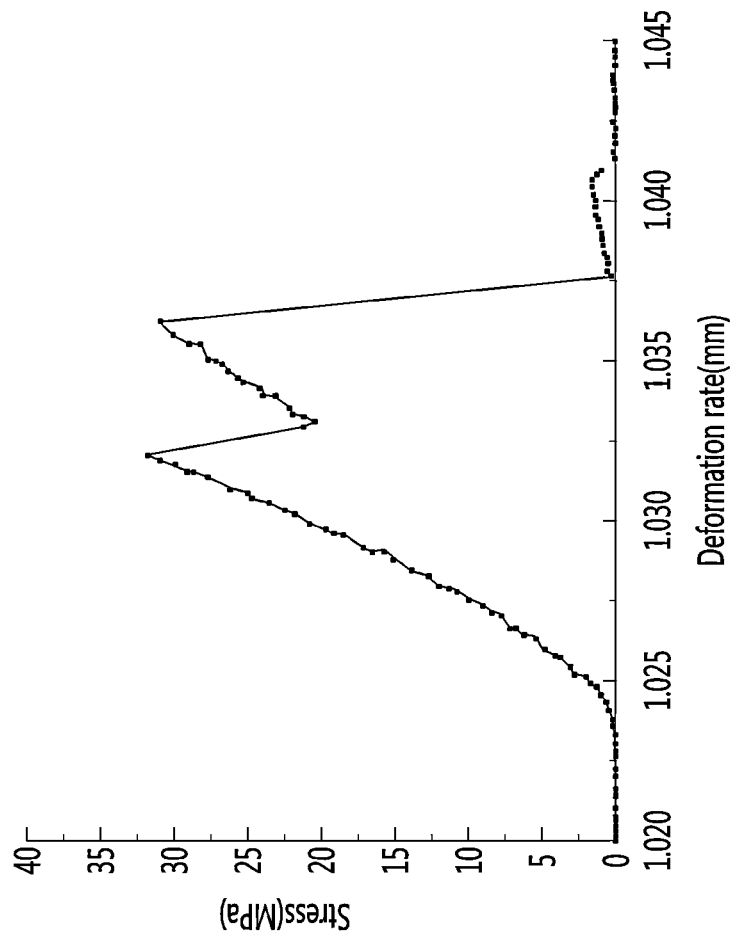
FIG. 10 is a graph illustrating a deformation rate-stress curved line of the spacer according to the present exemplary embodiment including alumina particles and silica particles.
Figure 11:
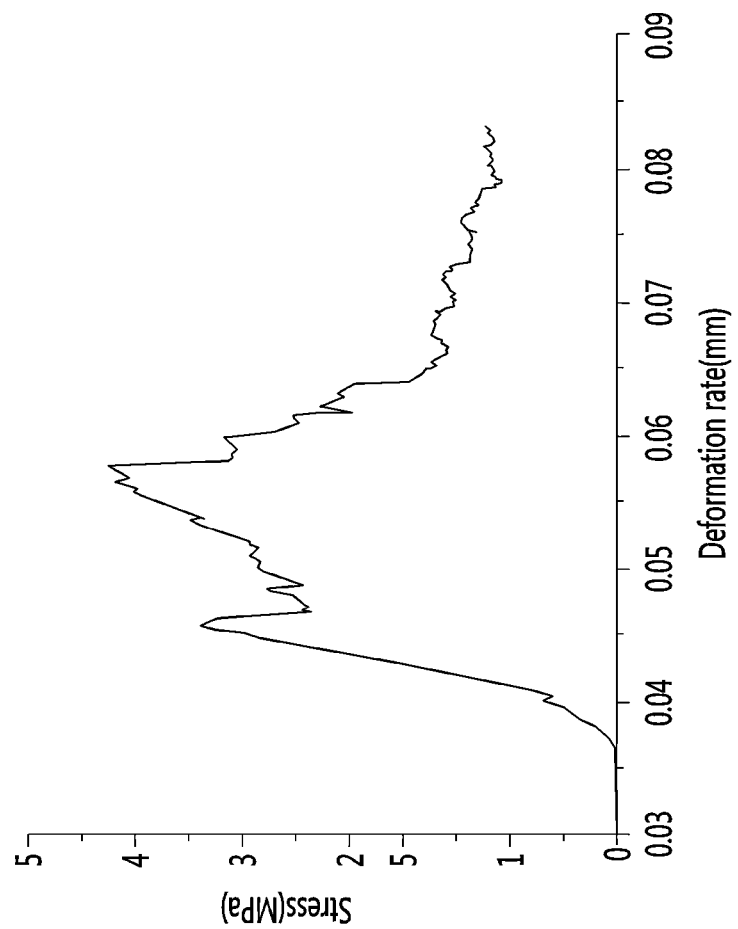
FIG. 11 is a graph illustrating a deformation rate-stress curved line of the spacer according to a comparative example which does not include alumina particles and silica particles.

FIG. 10 is a graph illustrating a deformation rate-stress curved line of the spacer according to the present exemplary embodiment including alumina particles and silica particles, and FIG. 11 is a graph illustrating a deformation rate-stress curved line of the spacer according to a comparative example which does not include alumina particles and silica particles.

Referring to FIGS. 10 and 11, a maximum compression strength of the spacer according to the present exemplary embodiment is approximately 33 MPa, and a maximum compression strength of the spacer according to the comparative example is approximately 4.1 MPa, so that it may be identified that the spacer according to the present exemplary embodiment implements an eight times improved compression strength in comparison with the spacer according to the comparative example manufactured by only the water glass.

Meanwhile, the following torch using method will be applied when the edges of the first glass plate 11 and the second glass plate 12 are welded in the fourth step S40 of the method of manufacturing the vacuum glass panel 10.

Figure 12:
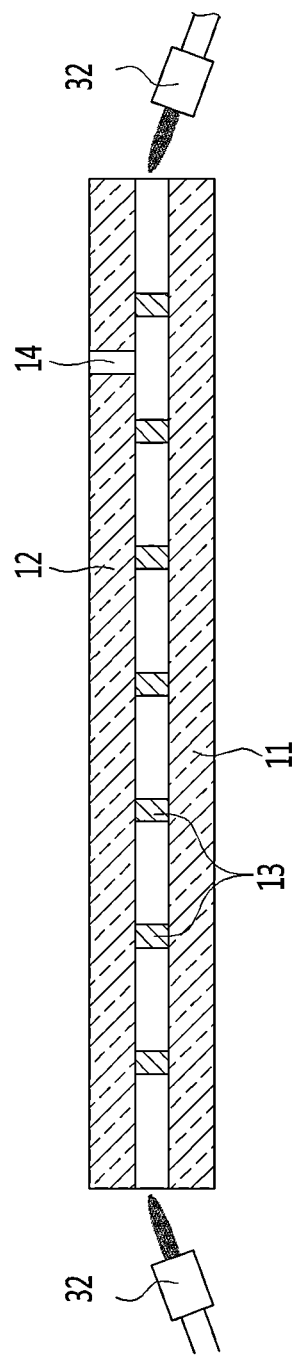
FIG. 12 is a diagram schematically illustrating a first variation example of the fourth step of the manufacturing process of the vacuum glass panel illustrated in FIG. 6.

FIG. 12 is a diagram schematically illustrating a first variation example of the fourth step of the vacuum glass panel manufacturing process illustrated in FIG. 6.

Referring to FIG. 12, edges of the first glass plate 11 and the second glass plate 12 are heated by a flame coming from a torch head 32 and then melted, thereby attaching the edges of the two glass plates 11 and 12 in the fourth step S40. Then, the first and second glass plates 11 and 12 are integrally welded while being hardened after the edges of the first glass plate 11 and the second glass plate 12 are melted by the heat and attached to each other.

Figure 13:
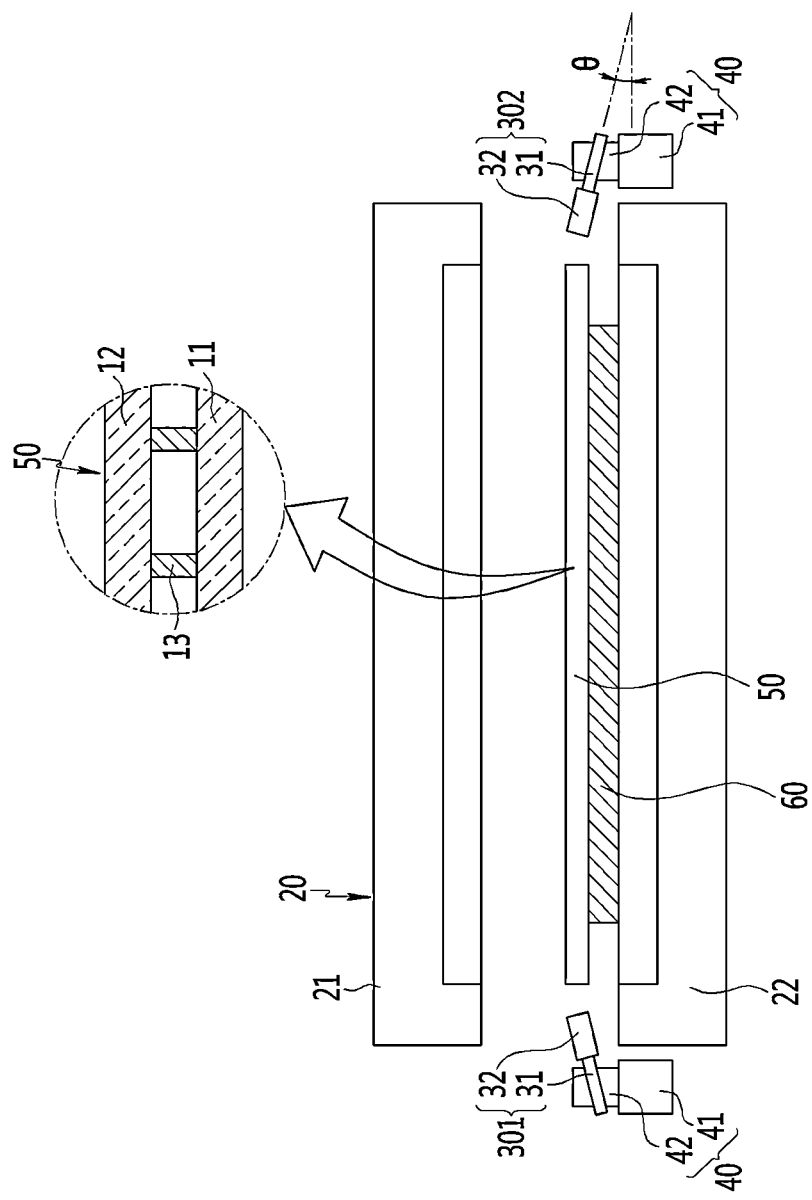
FIG. 13 is a configuration diagram illustrating an electric furnace and a torch part used in the fourth step illustrated in FIG. 12 and a transfer device.

FIG. 13 is a configuration diagram illustrating an electric furnace and a torch part used in the fourth step illustrated in FIG. 12 and a transfer device.

Referring to FIG. 13, in the fourth step S40, an electric furnace 40, torch parts 35 and 36, and a transfer device 50 are used for welding edges of the first glass plate 11 and the second glass plate 12. The electric furnace 40 functions to preheat the first glass plate 11 and the second glass plate 12, and the torch parts 35 and 36 forms flames to function to melt the edges of the two glass plates 11 and 12. The transfer device 50 functions to move the torch parts 35 and 36 along the edges of the two glass plates 11 and 12 at a predetermined speed.

Figure 14:
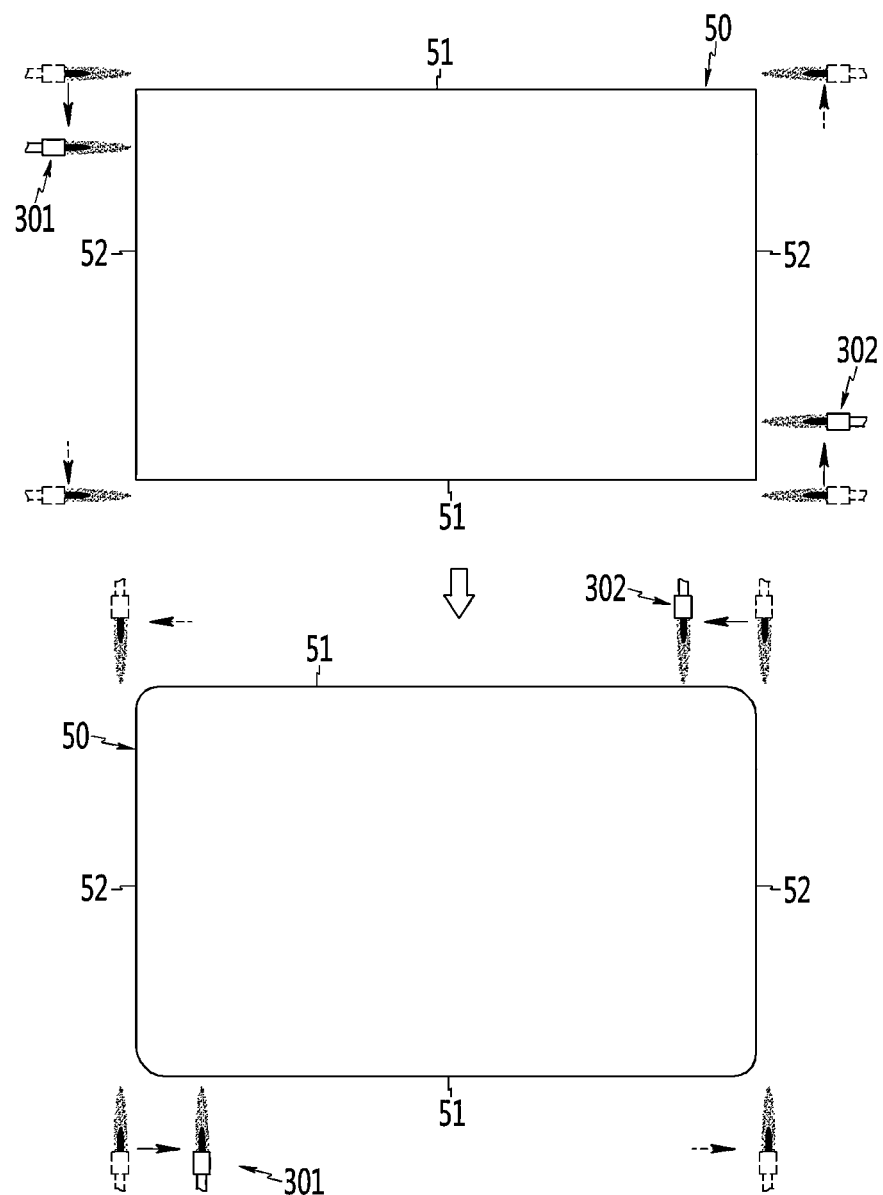
FIG. 14 is a top plan view illustrating a glass laminate and the torch part illustrated in FIG. 13.

In FIG. 13, reference numeral 55 indicates the first glass plate 11 and the second glass plate 12 laminated with the spacer 13 therebetween, and is referred to as a "glass plate lamination" for convenience. FIG. 14 is a top plan view illustrating the glass plate lamination and the torch part illustrated in FIG. 13.

Referring to FIGS. 13 and 14, the electric furnace 40 includes an upper body 41 and a lower body 42 spaced apart from each other, and a setter 43 and a glass plate lamination 55 are located on the lower body 42. A heater is installed in the upper body 41 and the lower body 42 to preheat the whole glass plate lamination 55. Accordingly, it is possible to prevent deformation of the glass plate lamination 55 by preventing stress concentration according to a local heat (local heat applied to the edge by a torch flame) of the glass plate lamination 55.

The setter 43 is located between the lower body 42 and the glass plate lamination 55 to support the glass plate lamination 55 and allow the glass plate lamination 55 not to be in contact with the lower body 42. The setter 43 maintains flatness of the glass plate lamination 55 in a high temperature process, and prevents deformation of the glass plate lamination 55 by gradually cooling the glass plate lamination 55 when the cooling is performed.

The torch parts 35 and 36 include a torch main body 31 and a torch head 32 connected with the torch main body 31. The torch main body 31 includes a gas line and a water cooling line, and transfers a heat source gas such as a hydrogen mixed gas to the torch head 32. The torch head 32 includes a plurality of nozzles to form a torch flame. The torch head 32 is located between the upper body 41 and the lower body 42 of the electric furnace 40 to apply the torch flame to the glass plate lamination 55, and the torch main body 31 is located in an external side of the electric furnace 40.

The transport device 50 is installed in a lower part of the torch main body 31 to support the torch main body 31, and has a function of controlling a vertical height and inclination angle of the torch main body 31 as well as a function of moving the torch main body 31 in a horizontal direction. The transfer device 50 includes a first transfer unit 51 for moving the torch main body 31 in the horizontal direction and a second transfer unit 52 for controlling a vertical height and an inclination angle of the torch main body 31.

Here, the horizontal direction refers to a direction parallel to an edge of the glass plate lamination 55, and the vertical height refers to a height of the torch main body 31 from a ground. Further, the inclination angle refers to an inclination angle between the ground and both the torch main body 31 and the torch head 32. The first transfer unit 51 and the second transfer unit 52 may be configured by a general mechanical device equipped with a motor, a gear box and the like, respectively.

The torch head 32 is not installed to be parallel to the ground, but may be installed in such a manner that an end part of the torch head 32 toward the glass plate lamination 55 is upwardly or downwardly inclined. FIG. 13 illustrates that the end part of the torch head 32 faces upwards and the inclination angle of the torch head 32 is indicated by θ. In this case, it is possible to prevent a weld fault by retraining a molten pool from flowing down when the edges of the first glass plate 11 and the second glass plate 12 are melted so that the molten pool is generated.

Two torch parts 35 and 36 are provided for on glass plate lamination 55. The torch part located in a left side of the glass plate lamination 55 is the first torch part 35 and the torch part located in a right side of the glass plate lamination 55 is the second torch part 36 based on FIGS. 13 and 14. The first torch part 35 and the second torch part 36 faces each other with the glass plate lamination 55 therebetween, and melt and weld the edge of the glass plate lamination 55 while moving in opposite directions, respectively.

The first glass plate 11 and the second glass plate 12 may be configured by a quadrangular plate having a predetermined thickness. FIG. 14 illustrates that the glass plate lamination 55 is a rectangular plate having a pair of long sides (first edge) 56 and a pair of short sides (second edge) 57 as an example, but the glass plate lamination 55 may be configured by a square plate. In this case, the first edge and the second edge have the same length.

In the fourth step S40, the first torch part 35 is located in an external side of the left short side 57, and the second torch part 36 is located in an external side of the right short side 57. At this time, a start position of the first torch part 35 is an external side of one corner of the left short side 57, and a start position of the second torch part 36 is an external side of the other corner of the right short side 57. That is, in the start positions, the first and second torch parts 35 and 36 are located in opposite sides in opposite angle directions of the glass plate lamination 55.

In the start positions of the first torch part 35 and the second torch part 36, the torch head 32 receives a heat source gas and generates a flame. The edges of the first glass plate 11 and the second glass plate 12 are melted and attached by heat applied from the flame, so that the edges are integrally welded. The first and second torch parts 35 and 36 move in opposite directions by the transfer device 50 to move the torch flame along the short side 57 of the glass plate lamination 55 at a predetermined speed.

Accordingly, based on FIG. 14, the welding is performed from a top to a bottom of the left short sides 57 of the first and second glass plates 11 and 12 facing the first torch part 35, and the welding is performed from a bottom to a top of the right short sides 57 of the first and second glass plates 11 and 12 facing the second torch part 36.

Thereafter, the first torch part 35 moves to an external side of the lower long side 56 of the glass plate lamination 55, and the second torch part 36 moves to an external side of the upper long side 56 of the glass plate lamination 55. At this time also, the first torch part 35 is located in the external side of one corner of the long side 56 and the second torch part 36 is located in the external side of the other corner of the long side 56, so that the first and second torch part 35 and 36 are located in opposite sides in opposite angle directions of the glass plate lamination 55.

The first and second torch parts 35 and 36 move in opposite directions by the transfer device 50 to move the torch flame along the long side 56 of the glass plate lamination 55 at a predetermined speed. Accordingly, the welding is performed from a left side to a right side of the lower long sides 56 of the first and second glass plates 11 and 12 facing the first torch part 35, and the welding is performed from a right side to a left side of the upper long sides 56 of the first and second glass plates 11 and 12 facing the second torch part 36.

That is, the first and second torch parts 35 and 36 weld the edges of the first glass plate 11 and the second glass plate 12 while simultaneously moving in a counterclockwise direction. FIG. 14 illustrates that the first and second torch parts 35 and 36 weld the short side 57 and then the long side 56 while moving in the counterclockwise direction as an example, but the first and second torch parts 35 and 36 may first weld the long side 56 while moving in a clockwise direction.

Figure 15:
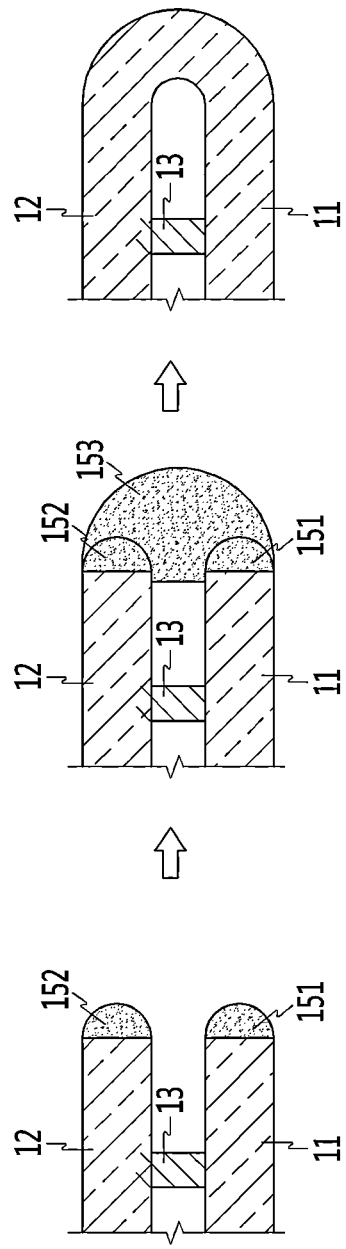
FIG. 15 is a schematic view illustrating a process of welding a first glass plate and a second glass plate performed in the fourth step illustrated in FIG. 12.

FIG. 15 is a schematic view illustrating a process of welding the first glass plate and the second glass plate performed in the fourth step S40.

Referring to FIG. 15, the edges of the first glass plate 11 and the second glass plate 12 are melted by the heat applied by the torch flame, so that molten pools 171 and 172 are formed in the edges of the glass plates 11 and 12, respectively. The molten pools 171 and 172 are a viscous melted glass and have a convex shape by surface tension. When the torch heating continues, the molten pools 171 and 172 formed in the respective glass plates 11 and 12 become large, and are united into one by pulling the molten pool formed in another glass plate. At this time, the molten pool 173 united into one has a convex shape by surface tension, and the edges of the two glass plates 11 and 12 harden by the cooling and thus maintain their shapes.

Accordingly, the edges of the first glass plate 11 and the second glass plate 12 bend toward each other with a predetermined curvature and integrally welded, and a boundary surface is not observed between the first glass plate 11 and the second glass plate 12. A heating temperature by the torch flame may range from approximately 550° C. to 600° C. In such a temperature range, tissue of the two glass plates 11 and 12 themselves does not greatly changed and damaged.

Referring to FIGS. 14 and 15, the two torch parts 35 and 36 are located in opposite sides and move the torch flame in opposite directions in the welding process of the fourth step S40. Accordingly, a time spent on the welding is reduced, and also the deformation of the glass plates 11 and 12 according to the stress concentration is restrained by effectively dispersing heat stresses generated when the two glass plates 11 and 12 are melted and then hardened.

That is, two welding positions generated in the two glass plates 11 and 12 by the position setting of the first and second torch parts 35 and 36 at least maintain a longer distance than short side lengths of the two glass plates 11 and 12. Accordingly, the heat stresses generated in the two welding positions does not influence each other, and heat balance may be achieved for the pair of long sides and the pair of short sides. Therefore, it is possible to restrain the deformation of the two glass plates 11 and 12 by dispersing the heat stresses and maintaining the heat balance.

Further, as the end part of the torch head 32 toward the first glass plate 11 and the second glass plate 12 is disposed to face upwards or downwards, it is possible to prevent the welding fault by restraining molten pools 171, 172, and 173 from flowing down when the molten pools 171, 172, and 173 are formed in the edges of the two glass plates 11 and 12. In addition, an effect that the torch flame pushes or pulls the molten pools 171, 172, and 173 is generated in this process.

The inclination angle θ of the torch head 32 may set to a value equal to or smaller than approximately ±20 degrees. At this time, a positive (+) inclination angle refers to a case where the end part of the torch head 32 faces upwards, and a negative (−) inclination angle refers to a case where the end part of the torch head 32 faces downwards.

Figure 16A:
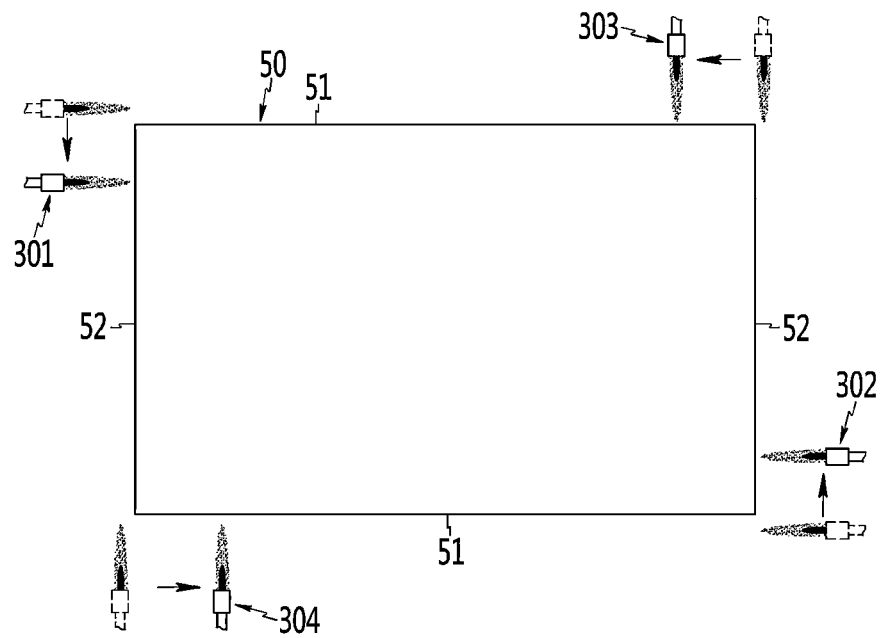
FIGS. 16A and 16B are top plan views illustrating a second variation example of the fourth step of the manufacturing process of the vacuum glass panel illustrated in FIG. 6.
Figure 16B:
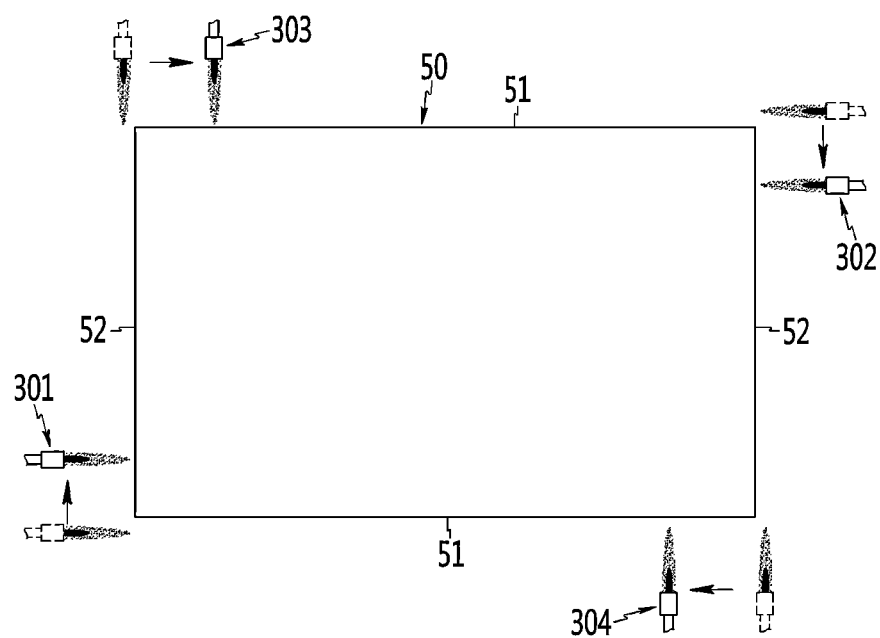

Meanwhile, although it has been described that the two torch parts 35 and 36 are used, the edges of the first glass plate 11 and the second glass plate 12 may be welded using four torch parts. FIGS. 16A and 16B are top plan views illustrating a second variation example of the fourth step of the vacuum glass panel manufacturing process illustrated in FIG. 6.

Referring to FIGS. 16A and 16B, torch parts 35, 36, 37, and 38 are arranged outside the respective sides 56 and 57 of the glass plate lamination 55. The first torch part 35 is located in an external side of one corner of the left short side 57, and the second torch part 36 is located in an external side of the other corner of the right short side 57. The third torch part 37 is located in an external side of one corner of the upper long side 56, and the fourth torch part 38 is located in an external side of the other corner of the lower long side 56.

In the start positions, the first and second torch parts 35 and 36 are located in opposite sides in opposite angle directions of the glass plate lamination 55, and the third and fourth torch parts 37 and 38 are located in opposite sides in other opposite directions of the glass plate lamination 55. The four torch parts 35, 36, 37, and 38 generate the torch flame, and simultaneously move in a clockwise direction or a counterclockwise direction to move the torch flame at a predetermined speed.

FIG. 16A illustrates that the four torch parts 35, 36, 37, and 38 move in the counterclockwise direction, and FIG. 16B illustrates that the four torch parts 35, 36, 37, and 38 move in the clockwise direction.

In the second variation example, the time spent on the welding may be reduced two times in comparison with the first variation example. Further, similarly to the first variation example, the heat stresses generated in the four welding positions do not influence each other and the heat balance may be simultaneously achieved for the pair of long sides 56 and the pair of short sides 57. Accordingly, it is possible to restrain the deformation of the two glass plates 11 and 12 by dispersing the heat stresses and maintaining the heat balance.

The manufacturing method in the second variation example is implemented in the same way to the manufacturing method in the first variation example except that the manufacturing method in the second variation example uses the four torch parts 35, 36, 37, and 38 in the fourth step S40. When process conditions of the torch part are equal, the vacuum glass panel manufactured by the method of the first variation example and the vacuum glass panel manufactured by the method of the second variation example have an equal shape.

Figure 17:
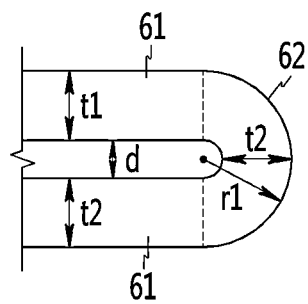
FIG. 17 is a partially expanded cross-sectional view of a vacuum glass panel manufactured by a method of the first and second variation examples.
Figure 18:
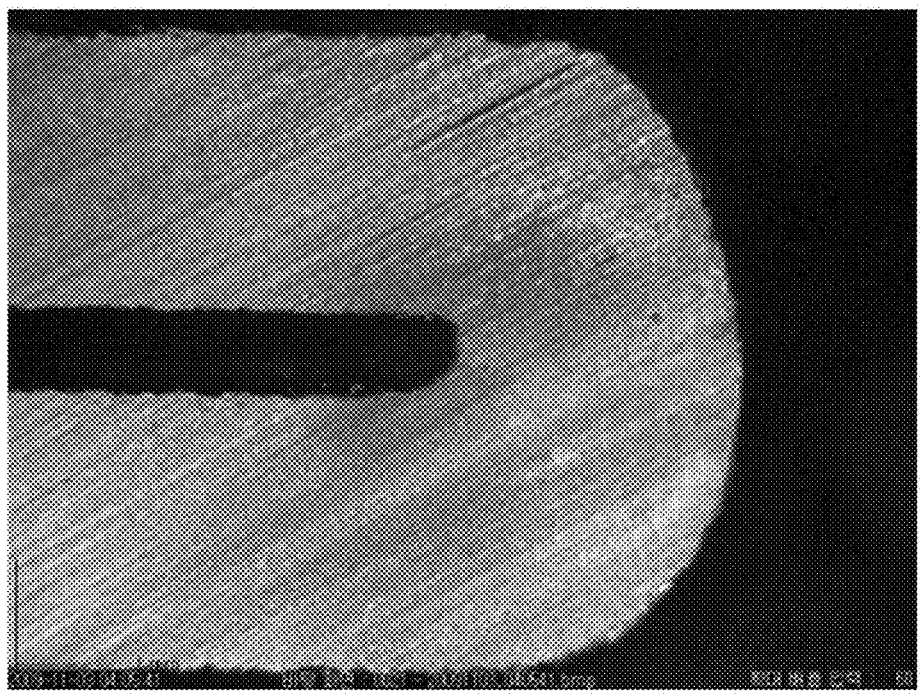
FIG. 18 is a picture illustrating a cross section of the vacuum glass panel.

FIG. 17 is a partially expanded cross-sectional view of the vacuum glass panel manufactured by the method of the first and second variation examples, and FIG. 18 is a picture illustrating a cross section of the vacuum glass panel.

Referring to FIGS. 1, 17 and 18, the edges of the first glass plate 11 and the second glass plate 12 are in contact with each other and integrally welded, and are convexly formed outwards. Four corners of the vacuum glass panel 10 are not formed as sharp corners but are formed round to have a predetermined curvature. The first glass plate 11 and the second glass plate 12 may have an equal thickness.

The vacuum glass panel 10 may be divided into a flat part 61 and a convex part 62 according to a shape of the cross section for convenience. The flat parts 61 are separated from each other by the spacer 13 and correspond to parts having a predetermined thickness t1, and the convex part 62 are connected to the two flat parts 61 and correspond to a part bent with a predetermined curvature R. Here, the curvature R of the convex part 62 refers to a curvature of an external side of the convex part 62.

In FIG. 17, t2 denotes a center thickness of the convex part 62 measured along a surface direction of the flat part 61, and d denotes a height of the spacer 13, that is, a gap between the first glass plate 11 and the second glass plate 12. The convex part 62 in the vacuum glass panel 10 may satisfy at least on of the following two conditions.

$$(t1+(d/2)) \leq R \leq 4(t1+(d/2)) \quad\quad 1$$

$$0.6 t1 \leq t2 \leq 1.4 t1 \quad\quad 2$$

When the curvature R of the convex part 62 is smaller than (t1+d/2) or the thickness t2 of the convex part 62 is smaller than 0.6 t1, the durability of the vacuum glass panel 10 may be deteriorated since a sufficient compression strength cannot be secured in the edges of the two glass plates 11 and 12. Meanwhile, when the curvature R of the convex part 62 exceeds 4 (t1+d/2) or the thickness t2 of the convex part 62 exceeds 1.4 t1, material consumption is increased and a width of the convex part 62 is excessively increased without a compression strength effect. Further, an insulation effect may be deteriorated by the heat transfer.

For example, when the thickness t1 of the first glass plate 11 and the second glass plate 12 is 3 mm and the height of the spacer 13 is 0.2 mm, the thickness t2 of the convex part 62 may approximately range from 2 mm to 4 mm, and the curvature R of the convex part 62 may approximately range from 3.1 mm to 10 mm. When the thickness t1 of the first glass plate 11 and the second glass plate 12 is 5 mm and the height of the spacer 13 is 0.2 mm, the thickness t2 of the convex part 62 may approximately range from 3 mm to 6 mm and the curvature R of the convex part 62 may approximately range from 5.1 mm to 20 mm.

Since the aforementioned vacuum glass panel 10 does not use the sealing material, it is possible to prevent deformation and discoloration problems of the glass plates 11 and 12 according to the use of the sealing material and a vacuum degree deterioration problem due to the degassing of sealing material. Further, since a process of separately manufacturing the sealing material and assembling and arranging the sealing material between the two glass plates 11 and 12 may be omitted, it is possible to simplify a whole manufacturing process and reduce manufacturing costs. In addition, since there is no difficulty in handling a large sized glass plate, it is possible to easily manufacture the large sized vacuum glass panel 10.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of manufacturing an insulated vacuum glass panel, the method comprising:
    preparing a paste for a spacer, wherein the paste includes at least one of a water glass and silica sol, an alumina ($Al_2O_3$) powder, a silica ($SiO_2$) powder, and a plasticizer, but does not include a frit;
    screen-printing the paste on one of a first glass plate and a second glass plate and drying the paste to form a plurality of spacers;
    laminating the first glass plate and the second glass plate with the plurality of spacers therebetween; and
    welding edges of the first glass plate and the second glass plate such that the edge of first glass plate and the edge of second glass plate directly contact with each other without a frit and evacuating an internal space to form a vacuum space,
    wherein at least two torch parts are disposed at external sides of the edges of the first glass plate and the second glass plate due to the welding of the edges of the first glass plate and the second glass plate by melting the edges with heat from the at least two torch parts such that the at least two torch parts are disposed on opposite sides with the first glass plate and the second glass plate therebetween, and move in opposite directions,
    wherein the first glass plate and the second glass plate are formed of a square plate including a pair of first edges and a pair of second edges facing each other such that a first torch part and a second torch part are located at external sides of the pair of first edges, respectively,
    wherein the first torch part and the second torch part move in opposite directions to weld the pair of first edges, and
    wherein the at least two torch parts are slantly installed such that end parts toward the first glass plate and the second glass plate face upwards or downwards.

2. The method of claim 1, wherein the paste further includes a titanium dioxide ($TiO_2$) powder, and in the paste, an amount of the alumina ($Al_2O_3$) powder is greater than an amount of the silica ($SiO_2$) powder and the amount of the silica ($SiO_2$) powder is greater than the amount of the titanium dioxide ($TiO_2$) powder.

3. The method of claim 2, wherein:
    the paste includes at least one compound 40 wt % to 50 wt % selected from the group consisting of the water glass and the silica sol, alumina ($Al_2O_3$) powder 20 wt % to 30 wt %, silica ($SiO_2$) powder 15 wt % to 20 wt % and plasticizer 5 wt % to 10 wt %.

4. The method of claim 1, wherein:
    the paste has a viscosity ranging from 2,000 cps to 20,000 cps.

5. The method of claim 1, wherein:
    a start position of the first torch part is an external side of one corner of the first edge, and a start position of the second torch part is an external side of the other corner of the first edge.

6. The method of claim 5, wherein:
    after the pair of first edges is welded, the first torch part and the second torch part move to external sides of the pair of second edges, respectively, and move in opposite directions to weld the pair of second edges.

7. The method of claim 6, wherein:
    a start position of the first torch part for the pair of second edges is an external side of one corner of the second edge, and a start position of the second torch part is an external side of the other corner of the second edge.

8. The method of claim 5, wherein:
    a third torch part and a fourth torch part are located on external sides of the pair of second edges, respectively, and
    the third torch part and the fourth torch part move in opposite directions while the first torch part and the second torch part move to simultaneously weld the pair of first edges and the pair of second edges.

9. The method of claim 8, wherein:
    a start position of the third torch part is an external side of one corner of the second edge, and a start position of the fourth torch part is an external side of the other corner of the second edge.

10. The method of claim 8, wherein:
    the first torch part, the second torch part, the third torch part, and the fourth torch part simultaneously move in a clockwise direction or a counterclockwise direction.

11. The method of claim 1, wherein the water glass and silica sol have an equal property to a property of the first glass plate and the second glass plate such that the at least one of the water glass and silica sol functions as an adhesive.

12. The method of claim 1, wherein the water glass and the silica sol have an adhesive property such that the at least one of the water glass and silica sol functions as an adhesive.

13. The method of claim 1, wherein the plasticizer comprises ethylene glycol.

* * * * *